FIG. I.

INVENTOR.
George R. Ericson

Dec. 6, 1955  G. R. ERICSON  2,725,717
CONTROL FOR SUCTION ACCESSORIES
Filed Sept. 17, 1951  2 Sheets-Sheet 2

INVENTOR.
George R. Ericson

United States Patent Office 2,725,717
Patented Dec. 6, 1955

2,725,717

CONTROL FOR SUCTION ACCESSORIES

George R. Ericson, Kirkwood, Mo.

Application September 17, 1951, Serial No. 246,979

14 Claims. (Cl. 60—19)

This invention relates to a system for maintaining more constant the source of negative pressure in the intake manifold of an internal combustion engine. More specifically, the invention relates to a mechanism automatically responsive under normal operating conditions, and selective at the demand of a pressure operated device to maintain a more constant suction in one portion or part of the intake manifold of an internal combustion engine.

Intake manifolds have long been utilized as a source of power for various pressure operated devices such as vacuum boosters, for steering, braking, or the like, transmission, control, etc. One of its best known uses is as a convenient source of vacuum for operating fluid type windshield wiper motors. It would be much better suited to these purposes, if the manifold, or some part thereof, could be controlled by some device whereby a more constant source of pressure would be maintained, and it is for this purpose that the present invention is adapted.

Power output for an internal combustion engine varies with manifold pressure, which is in turn, responsive to throttle opening. Demands for increased power output from the engine therefore are controlled directly by throttle opening and by a consequent increase in manifold pressure. This being the case, manifold pressure varies with throttle opening over a wide range, let us say, from twenty to twenty-five inches of mercury for throttle closed positions to practically zero for wide open positions of the throttle. Considering that requirements of vacuum motors are sometimes as high as five or six inches of mercury for satisfactory operation, it becomes obvious why such motors are not suitable in operation under all power demand conditions. Since booster or vacuum motors must have this continuous source of pressure for satisfactory operation, booster pumps have come into general use to supplement the intake manifold as a source of negative pressure.

Furthermore, there has been a recent trend in the automobile art to the use of electrically driven windshield wipers, which are unaffected by this variation in intake manifold pressures, and therefore operate satisfactorily regardless of power demands imposed upon the engine. All such devices, however, add to the expense of automobile construction, which is, it is believed, well recognized as a controlling factor in automotive design, because of the competitive nature of the business. For this reason a simple control means which may be added to the conventional carburetor of an internal combustion engine to control the aspiration of the engine in a manner to maintain a more continuous manifold pressure condition, might have wide acceptance in the art, provided, however, that such a device does not too seriously affect the power output of the engine.

It is the present practice in the automotive art to employ two or more intake manifolds, each serving in turn one or more but not all, of the intake ports of the engine. To serve these dual or multiple manifolds, it is usual to provide a carburetor having a plurality of barrels, with one or more barrels to serve each separate manifold, and with the barrels simultaneously or sequentially controlled to supplement the supply of fuel and air to each of the several manifolds. In carburetors of this kind it is usual to employ a velocity responsive auxiliary throttle, or the like in the barrel, for this purpose. It may be of the unbalanced "butterfly" type, such as generally employed in choke valves, or of the poppet type. It is the latter type which has been illustrated in connection with the present invention. Furthermore, it is to be understood that, while the invention is adapted in its use to the supplementary barrel or barrels which supply each manifold, it is also useful and has been illustrated as controlling the main carburetor barrel for one of the manifolds.

Briefly, the invention comprises a valve of either of the types above described applied in the barrel of a carburetor and biased to a flow-restricting position by spring means or the like, but provided also with a mechanism responsve to pressure conditions within the manifold to modify the amount of restriction. As shown and described below, separate means may also be employed whereby the means biasing the valve to flow-restricting position is also supplemented by a thermal responsive means. This structure, or one similar to it, I have shown and described in in a different application to a manifold by my prior Patent No. 2,209,329 of July 30, 1940. In addition, the structure also includes a means responsive to the demands for power of a pressure operated motor to enable the structure to operate under normal engine operating conditions, which means is in turn, conditioned for action by the above mentioned thermal responsve means.

The object of the nvention is to maintain a more constant source of negative pressure or suction in one of a plurality of intake manifolds of an internal combustion engine.

One of the objects of the invention is to provide a flow-restricting device in one of the barrels of a carburetor whch serves one manifold for aspirating a part of the cylinders in an internal combustion engine.

One of the objects of the invention is to provide a flow restricting pressure responsive device in one of the barrels of a carburetor connected to a manifold serving as an intake to some of the cylinders of an internal combustion engine.

One of the objects of the invention is to provide a device such as above set forth suitable for use in either the primary or secondary barrel of a multi-barrel carburetor serving a manifold to some, but not all of the cylinders, of an internal combustion engine.

One of the objects of the invention is to provide a control mechanism adapted to minimize fluctuations in manifold pressure, capable of connection to a secondary velocity responsive throttle such as used in multi-barrel carburetors.

One of the objects of the invention is to provide such a device with a control responsive to demands of a fluid operated motor deriving its power from the controlled manifold.

One of the objects of the invention is to provide a device with a control responsive to demands of a fluid operated motor deriving its power from the controlled manifold to enable operation of the device.

One of the objects of the invention is to provide a heat responsive overriding mechanism for such a device.

One of the objects of the invention is to provide means responsive to demands of the fluid motor to condition the control for manifold pressure for operation.

One of the objects of the invention is to provide a control for restricting the range of fluctuation of manifold pressures responsive to both manifold static and dynamic pressures, and conditioned by demand of a fluid motor power source.

One of the objects of the invention is to provide a control for restricting the range of fluctuations of manifold pressure in one of two or more manifolds of an internal combustion engine which is responsive to both manifold static and dynamic pressures and conditioned by demand for power of a fluid motor.

One of the objects of the invention is to provide a device, as stated immediately above, wherein the conditioning is subject to a control responsive to engine temperature.

One of the objects of the invention is to provide a control for restricting the range of fluctuation of static manifold pressure responsive both to this pressure and dynamic flow, measured separately or together against a desired standard to determine that range.

One of the objects if the invention is to provide in a control as described immediately above a standard which may be varied as to rate and as to range.

One of the objects of the invention is the same as that immediately above described, wherein the desired standard is also compensated by engine temperature and conditioned by fluid motor demand.

Of course, all the objects expressed in applicant's prior patent are equally applicable to the structure hereinafter described.

Referring to the drawings.

Figure 1:
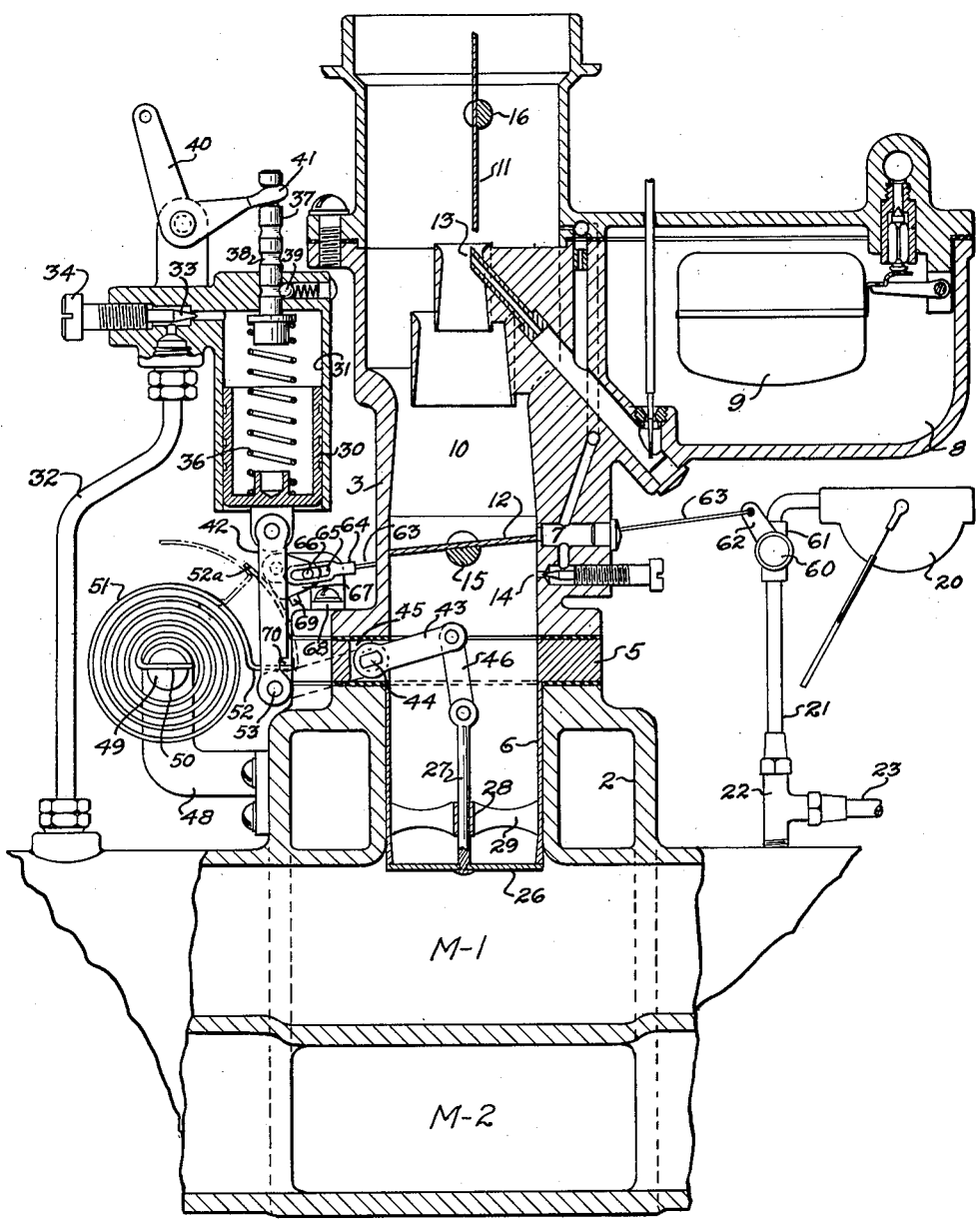
Fig. 1 is a diagrammatic view in elevation and partly in cross-section of an internal combustion engine intake manifold, carburetor, and windshield wiper motor, as illustrating one arrangement incorporating the present invention.
Figure 2:
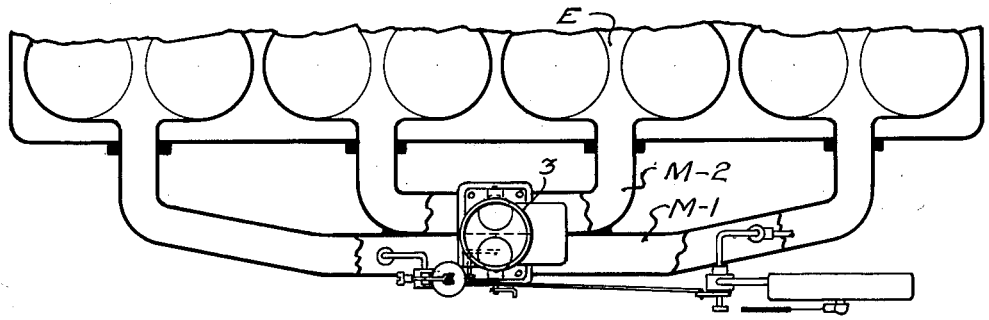
Fig. 2 is a plan view diagrammatically illustrating the same arrangement of the invention on a dual manifold of an eight-cylinder engine.

In the drawings, Fig. 2 shows an engine E having a plurality of cylinders, in this case eight, served by dual intake manifolds indicated as M–1 and M–2. The manifolds M–1 and M–2, if desired, may be provided with a stove 2, such as shown in Fig. 1, in the form of an exhaust gas jacket from exhaust manifold M–2, for heating the mixture during its passage from the carburetor to the intake manifolds M–1 and M–2. A conventional carburetor 3 is shown attached to the intake manifolds M–1 and M–2. This carburetor may be of the downdraft type as illustrated, or may be of the horizontal or updraft variety by simple rearrangement of the fittings attaching the carburetor to the manifold and modification of the float chamber designed position with respect to the air horn of the carburetor.

Only one barrel of the carburetor is illustrated in Fig. 1 at 3, but it is to be understood that this may be either a single barrel type or one barrel of a multi-barrel variety of carburetor such as illustrated in Fig. 2. In the case of a multi-barrel type, such as in Fig. 2, the throttle shaft 15 operates both throttle valves, and the invention below described may be applied in the same manner to the secondary barrel. In any event, the structure shown is exemplary of the manner in which the invention is applied to one or more of the carburetor barrels.

As shown, the carburetor has a float chamber 8 forming a fluid reservoir for the fuel, and the level of the fuel is maintained therein by the float 9 operating the usual inlet valve. The mixing conduit of the carburetor, as shown at 10, has a choke valve 11 mounted on the choke valve shaft 16, which may be either manually or automatically operated. The shaft 16 mounts the unbalanced butterfly valve 11 eccentrically of the mixing chamber, so as to fully close the passage through the mixing chamber or air horn when the valve is in a horizontal position and be biased toward open, by airflow due to its eccentricity. A throttle valve shaft 15 is mounted in the walls of the mixing conduit and carries the balanced throttle valve 12 adapted to be manually operated in the usual manner to control the air flow past the low speed fuel nozzles 7 and 14, and high speed fuel nozzle 13.

To the right is shown a windshield wiper and motor 20, in reduced scale, connected to the intake manifold M–1 to which the carburetor is attached by means of a tube 21 and a fitting 22 threaded in the manifold. Connection 23 from the fitting 22 may lead to booster-motors or servo-motors for operating the steering, transmission or brakes of the automobile. The construction and operation of these accessories are well known, and, since they form no part of my present invention in themselves, they are neither shown nor described in detail. The carburetor 3 is mounted on the intake manifolds M–1 and M–2 on a flange member 5 having a downwardly extending sleeve formed thereon for extension into the manifold M–1. This flange member is attached between the carburetor and manifold, and is firmly held in place by conventional studs. The sleeve 6 extends downwardly through the usual riser on the manifold, and is provided with an inverted poppet valve 26 slidably mounted in a guide 28 in the center of the sleeve, which guide is carried by struts 29 attached to the sleeve. Valve 26 is in turn operated by a piston 30 slidably mounted in a cylinder 31, which has its upper end connected to the intake manifold M–1 by means of a tube 32. The effective capacity of the suction line 32, and thereby the rate of response of the piston 30, is adjusted by a valve 33 provided with a head 34 having a screwdriver slot for manual adjustment. Any type of locking means may be provided on the valve 33 to maintain it in adjusted position.

Between the piston and a movable or adjustable abutment mounted directly above in cylinder 31 is interposed a spring 36. The tension of the spring may be in turn controlled by adjustment of the rod 37 upwardly and downwardly in the upper end of the cylinder. For this purpose it is provided with grooves 38 for coincidence with a ball detent 39, and may be positioned manually by any suitable means through pivoted rocker arm 40 attached thereto by a fork end 41. The piston 30 is attached to actuate the poppet valve 26 through a linkage which comprises a link 42 connected to a lever 43 which is fixedly mounted on a rotatable shaft 44. Shaft 44 extends outside the flange 5, at which point it is connected to one part of lever 43 and extends inside of the same flange, where it terminates in a recess 45, and is rigidly attached to the other part of lever 43 which connects with a link 46 pivoted to the stem 27 of the poppet valve.

Mounted on the exhaust jacket 2 is a bracket 48, which carries a short shaft 49. The shaft 49 is provided with a slit 50 to which is fixed the inner end of a thermostatic coil 51. The outer end of the coil is indicated at 52, and, it will be noted, comprises a downwardly projecting part in a direction toward the connection between the levers 42 and 43, and a tangentially extending part indicated as 52a, which is for a purpose later to be described. However, the outer end 52 of the coil projects over an extension of the pin 53, serving as a pivot connection between links 42 and 43, so that when the temperature is low, the coil 51 will tend to rotate in a clockwise direction and thereby add additional resistance to the opening of the valve 26. Coil 51 is a conventional bi-metallic thermostatic device constructed and arranged to rotate in a clockwise direction when temperature is decreased, all in a manner well known in the art.

While the relative strength of the spring 36 and the coil 51 may be varied as desired to suit the requirements of a particular type of engine, I prefer to construct the spring 36 in such a manner as to provide sufficient resistance to the opening of the valve during the operation of the engine in the upper temperature ranges to insure a throttling action by the poppet valve 26 to aid in the atomization of the fuel.

Since the pressure exerted by the spring 36 may be adjusted by operation of the bell crank 40, a wide range of action is provided by the device.

The diameter of the piston 30 and its cylinder 31 may be varied in accordance with the relative lengths of the levers 43 and 46, together with the diameter of the valve 26, but I prefer to construct and arrange the relative proportion of these members, together with the strength of the spring 36, so that sufficient manifold depression will be maintained to cause continuous operation of the several vacuum operated devices powered by connection with the intake manifold M-1. Although this throttling may affect the maximum power output of the engine, it would not be too serious a disadvantage under slippery conditions when full power is not desirable and when the accessories, such as the windshield wiper, are normally in use. The reduction in power available is minimized at least in part by taking the power from a portion of the intake manifold which delivers mixture to part of the cylinders only, in this case four, but, as will be seen later, the number of cylinders from which the power is taken may be two, as indicated in the modification of Fig. 3, or only a single cylinder, as in the modification in Fig. 4.

To control the power from the intake manifold M-1 to the windshield wiper motor 20, is provided the following mechanism, which comprises a knob 60 on a valve 61 in the line 21 between the wiper motor and the manifold. Knob 60 has fixed thereto a lever 62 connected in turn to a cable 63, which is broken to show that it passes behind the carburetor. To the left of the carburetor, the cable 63 is attached to a fitting 64 provided with a slot 65 slidably secured on a pin 66 of cam lever 67, which is in turn mounted on a bracket 68 secured to the flange of the carburetor. Cam lever 67 is provided with a latch 69 which extends in a horizontal direction for engagement with a notch 70 in the link 42. As shown, with the knob 60 rotated to the right, the windshield wiper motor is turned on, and in this righthand position (not shown) slot 65 engages pin 66 to remove latch 69 from notch 70 if it should be engaged. If not, then it maintains the latch 69 in inactive position. On the other hand, when knob 60 is in the off position, in which it is illustrated in the drawings, the latch 69 is capable of rotating due to gravity to ride against the righthand side of link 42, and, during operation of the engine, the latch 69 will engage notch 70 to maintain the link in at least a partially raised position, thereby minimizing some if not all of the throttling effect of poppet valve 26.

Thermostatic control is also provided for the latch 69, due to the fact that when the engine is at low operating temperature the tangentially extending part 52a rides against the cam lever 67, maintaining it in an inactive position. It is only when the engine is hot that the latch 69 is capable of engaging the notch 70, since, under such conditions, the tangentially extending part 52a of the thermostatic spring will be rotated to its dotted line position indicated, out of the orbit of rotation of the cam lever 67.

Figure 3:
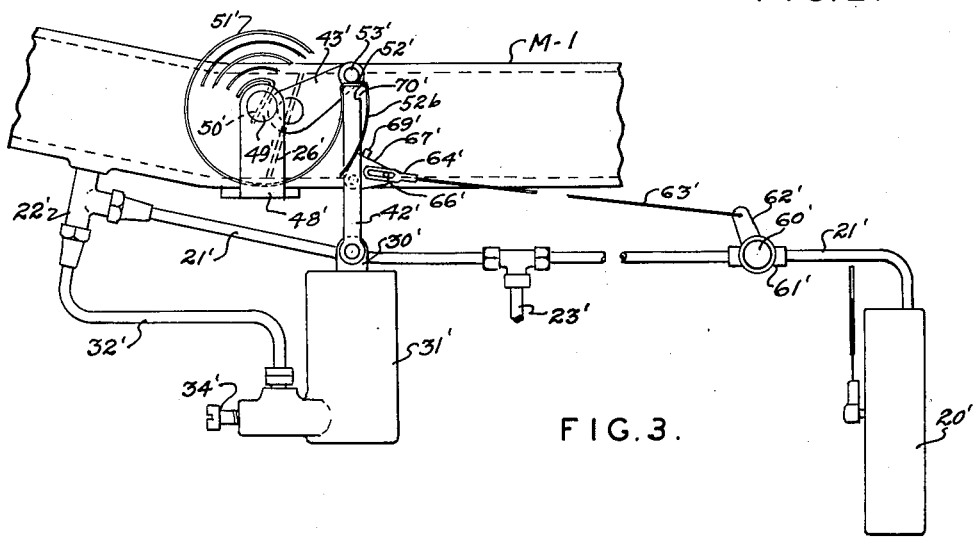
Fig. 3 is a diagrammatic showing of the invention arranged in one branch of a dual manifold which serves two cylinders of the engine.

Fig. 3 shows the invention applied to one branch only of a dual manifold M-1, which branch serves, in this particular case, but two cylinders of the engine. Similar reference characters, with a prime added, have been used to identify the like parts. In this embodiment, the cylinder 31' and its actuating mechanism comprising links 42', 43' have been removed from connection with the carburetor and are mounted directly on the intake manifold; otherwise, there is no difference between the structures in the first embodiment, Figs. 1 and 2, and that in Fig. 3.

In Fig. 3 the windshield wiper is indicated as 20', which is connected by a line 21' through a manually operated valve 60' and 61' with the portion of the intake manifold M-1 between the control valve 26' and the cylinders by means of a fitting 22'. Line 23' may be connected with other accessories to be operated by power from the manifold. From the fitting 22', a line 32' runs to the valve 34' which controls the flow to the cylinder 31' for actuation of the piston 30' therein, not shown. The piston 30' is in turn connected by link 42' with valve control arm 43'. In the manifold is an unbalanced butterfly valve, indicated as 26', mounted on a pivoted shaft to which the arm 43' connects.

From the above it can be readily understood that the accessories are connected to the portion of the manifold between the control valve 26' and the cylinders of the engine, and that they will in turn be actuated with this portion of the manifold as a power source on demand of the fluid operated motors. Variation in depression within this portion of the manifold is communicated to the control mechanism for the valve 26' through the usual line 32' to actuate this piston within the cylinder in response to variation in depression within this portion of the manifold. Movement of the piston in turn will control the position of unbalanced valve 26' within the manifold, and will tend to keep this depression more or less constant in response to the movement of the valve 26'.

Mounted on the intake manifold is also the bracket 48' carrying the shaft 49' slotted at 50' to receive the thermostat spring 51'. This spring is in turn provided with the radial extending portion 52' which in one position thereof bears directly against the pivot 53' between the crank arm 43' and lever 42'. Extension 52b on the thermostat spring extends circumferentially about the center mounting of the thermostat.

Mounted on the manifold is a latch member 67' provided with an outwardly extending lug 69' for engagement with notch 70' in the link 42'. Latch 67' is in turn connected by a lost motion connection comprising the slotted eye 64' engaging pin 66' through attached cable 63' to lever 62', which turns with the manual control knob for the windshield wiper motor 20'.

Operation of this particular modification is identical with that described above with respect to the embodiment in Figs. 1 and 2, except that the power source is from two cylinders instead of four.

Figure 4:
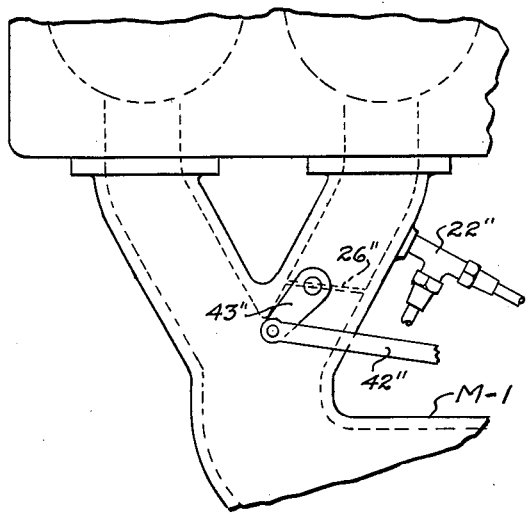
Fig. 4 is a diagrammatic showing similar to Fig. 3 showing the same mechanism adapted to the branch leading from the manifold to a single cylinder of the engine.

In Fig. 4 is shown a modification in which the control valve 26" is mounted in one branch only of a manifold M-1 leading to a single cylinder. It will be understood that the control mechanism for the valve 26" comprising the crank 43" and the link 42" lead to the control mechanism which is suitably located to serve the mechanism as it is now positioned. Fitting 22' is located similarly between valve 26" and the cylinder. The operation of the device of Fig. 4 is exactly as has been described above for the preceding devices.

From the above description of the structure it will be apparent that a mechanism has been disclosed capable of performing satisfactorily each of the objects recited.

Obviously, when slightly open, at least, the valve 26 will be urged to full open position by the velocity of air past the throttle valve. In this respect this valve reacts the same as any unbalanced butterfly valve.

Likewise, any manifold pressure or vacuum high enough to raise piston 30 will act upward on link 42 and downward on stem 27 to open the valve 26. Valve 33 gives a throttling action to determine its rate of response. Therefore, the control for valve 26 includes means responsive to dynamic and static pressures in the manifold, and the latter incorporates rate control.

On the other hand, however, the opening of valve 26 is opposed by the force of spring 36, which is adjustable, and by the force of thermal responsive coil 51 when the engine is cold, but not when hot.

When the power to the wiper motor is cut off by closing valve 61, and the engine is hot, thermal responsive spring 51 is in the dotted line position and latch 69 is free to engage the notch 70 to either limit throttling action of valve 26 or hold it in a fully depressed inactive position, whichever is deemed desirable. It should be pointed out at this time that when manifold pressure drops, or when its degree of vacuum exceeds the minimum demanded for satisfactory operation of the servo-motor or wiper motor, valve 26 will be open due to the action of piston 30, and the latch will be opposite notch 70, so that inter-engagement is possible to limit closing action of the valve 26 and its control function. If the engine is cold, the latch will be disengaged at all times.

On the other hand, when the servo-motor or wiper motor demands power from the manifold, valve 61 will be turned clockwise from the position shown, thereby withdrawing latch 69 whereby the valve pressure responsive control will be operative to maintain manifold pressure low enough to guarantee satisfactory wiper motor operation.

It is to be understood, of course, that control of the latch 69 is not exclusive with the wiper motor. If other servo-motors are connected with the system disclosed, the latch is also connected to be controlled therefrom in response to demands for power from the power source by each servo-motor.

Of course, this will detract some from the power available from that part of the engine served by one of the intake manifolds, but its effect on the total power available will be considerably less than in my prior device. Furthermore, in applications of this control to the secondary barrel of a two-barrel carburetor, the effect on power available will not be detectable at low speeds, because velocity through the secondary barrel is not sufficient to open the valve.

The effect of this control mechanism on the power available will not be detectable when it is mounted to control the depression in a manifold serving only a portion of the cylinders. If, for example, the amount of power available would be materially affected by using a manifold serving four cylinders, the invention contemplates application to but two of the four cylinders served by the particular manifold, or even one of the cylinders.

The invention is not regarded as limited by the illustrations, but only by the appended claims.

I claim:

1. In an engine intake system for providing a power source for air operated accessories, an intake manifold for aspiration of some but not all of the engine cylinders, a carburetor barrel having a primary throttle for controlling manifold pressures, a secondary throttle for controlling the mixture to at least one of said cylinders control connections for said secondary throttle responsive to pressures and velocities in the intake system, and independently controlled means determining the range of closing movement of said secondary throttle and rate of response of said control connections.

2. In an engine intake system for providing a power source for air operated accessories, an intake manifold for aspiration of some but not all of the engine cylinders, a carburetor barrel having a throttle for controlling manifold pressures, a secondary throttle in the barrel and control connections for said secondary throttle responsive to pressures and velocities in the intake system, and means determining the range and rate of response of said control connections, including a latch to maintain said control connections at one extreme of said range.

3. In an engine intake system for providing a power source for air operated accessories, an intake manifold for aspiration of some but not all of the engine cylinders, a carburetor barrel having a throttle for controlling manifold pressures, a secondary throttle in the barrel and control connections for said secondary throttle responsive to pressures and velocities in the intake system, and means determining the range and rate of response of said control connections, including a latch and a thermal control to maintain said control connections at one extreme of said range under certain temperature conditions.

4. In an engine intake system for providing a power source for air operated accessories, an intake manifold for aspiration of some but not all of the engine cylinders, a multi-barreled carburetor having a primary throttle for controlling manifold pressures, a secondary throttle in a secondary barrel for controlling manifold pressures control connections for said secondary throttle responsive to pressures and velocities in the intake system and independently controlled means determining the range of closing movement of said secondary throttle and rate of response of said control connections.

5. In an internal combustion engine having a plurality of connecting fuel mixture inlet passages, an unbalanced throttle in one of said passages for controlling the admission of fuel to at least one of said passages, a fluid pressure motor connected posterior to said throttle for influencing the action of said throttle, and a temperature-controlled means on said engine for restricting the operating range of said throttle toward closed position when said engine has reached normal operating temperature.

6. In an internal combustion engine having a plurality of connecting fuel mixture inlet passages, a flow control valve in one of said passages for controlling the admission of fuel to at least one of said passages, a first fluid pressure motor connected posterior to said valve for influencing said flow control valve, a temperature-controlled means for restricting the operating range of said valve toward closed position when the engine has reached normal operating temperatures, a second fluid motor connected posterior to said valve, manual means for operating said second motor, and means responsive to the position of said manual means for increasing the operative range of said valve toward closed position.

7. In an internal combustion engine having a plurality of connecting fuel mixture inlet passages, a flow control valve in one of said passages for controlling the admission of fuel to at least one of said passages, a fluid pressure motor connected posterior to said valve for influencing the action of said flow control valve, and a temperature-controlled mechanism including a stop, said temperature-controlled mechanism resiliently opposing opening movement of said valve at low engine temperature and positioning said stop for restricting the operating range of said valve toward closed position when the engine has reached normal operating temperatures.

8. An engine induction system comprising a plurality of intake manifolds, a multi-barrel carburetor with at least one main and one auxiliary barrel connected to one of said manifolds, an unbalanced throttle for said auxiliary barrel, a suction motor for operating an accessory device connected posterior to said throttle, a control for said motor, a regulator operated by pressures posterior to said throttle for acting on said throttle, and means to restrict the action of said regulator in one position of said control.

9. An engine induction system comprising a plurality of intake manifolds, a multi-barrel carburetor with a main and auxiliary barrel connected to separate manifolds, an unbalanced throttle for said auxiliary barrel, a suction motor for operating an accessory device connected posterior to said throttle, a control for said motor, a regulator operated by pressures posterior to said throttle for acting on said throttle, and means to restrict the action of said regulator in one position of said control.

10. An engine induction system comprising a plurality of intake manifolds, a multi-barrel carburetor with a main and an auxiliary barrel connected to one of said manifolds, a throttle for said auxiliary barrel, a regulator device for said throttle operated by the pressure differential anterior and posterior of said throttle, a limiting means regulating the effect of said device, a suction motor operated by manifold pressure posterior said throttle, and a control means for said suction motor for modifying the effect of said limiting means.

11. In an internal combustion engine, a carburetor, including a throttle valve, an intake manifold connected to said carburetor, means for heating a portion of the wall of said intake manifold adjacent said carburetor, a movable means posterior to said throttle valve for restricting the mixture flow to a path adjacent said heated wall, and a temperature-responsive spring for controlling the range of movement of said movable means to restrict the flow to said path at low engine temperatures.

12. In an internal combustion engine having an intake manifold including a transverse passage and an inlet passage connected at an angle thereto, means for heating a portion of the wall of said intake manifold adjacent said passages, valve means for restricting the flow from said inlet passage to a path adjacent said heated wall, and control means for said valve, including a temperature adjusted spring to position said valve to restrict the flow to said path at low engine temperatures.

13. The combination defined in claim 12, including a latch associated with said spring to maintain said valve means in an open range of positions at higher temperature.

14. The combination defined in claim 13, wherein a manual control for said latch.

References Cited in the file of this patent

UNITED STATES PATENTS

| | | |
|---|---|---|
| 2,209,329 | Ericson | July 30, 1940 |
| 2,473,806 | Mallory | June 21, 1949 |
| 2,505,292 | Mallory | Apr. 25, 1950 |